United States Patent
Van Laar et al.

(10) Patent No.: US 8,677,871 B2
(45) Date of Patent: Mar. 25, 2014

(54) CUTTING DEVICE

(75) Inventors: Gerard Johannes Van Laar, Vaassen (NL); Franciscus Cornelis Bierens, Vaassen (NL); Franciscus Johannes Wilhelums Kooiman, Hengelo (NL)

(73) Assignee: VMI Epe Holland B.V., Epe (NL)

( * ) Notice: Subject to any disclaimer, the term of this patent is extended or adjusted under 35 U.S.C. 154(b) by 1052 days.

(21) Appl. No.: 10/592,884

(22) PCT Filed: Mar. 18, 2005

(86) PCT No.: PCT/NL2005/000208
§ 371 (c)(1),
(2), (4) Date: Apr. 28, 2008

(87) PCT Pub. No.: WO2005/087481
PCT Pub. Date: Sep. 22, 2005

(65) Prior Publication Data
US 2010/0294099 A1    Nov. 25, 2010

(30) Foreign Application Priority Data

Mar. 18, 2004  (NL) ..................................... 1025764
Mar. 18, 2004  (NL) ..................................... 1025767

(51) Int. Cl.
*B26D 5/20*   (2006.01)
*B26D 5/08*   (2006.01)
*B26D 1/18*   (2006.01)
*B26D 5/00*   (2006.01)
*B29D 30/08*  (2006.01)
*B29C 65/00*  (2006.01)

(52) U.S. Cl.
USPC ................. 83/76.8; 83/614; 83/486.1; 83/72; 83/937; 83/483; 156/406.4; 156/523

(58) Field of Classification Search
USPC ............... 83/614, 486.1, 72, 76.4, 76.6, 76.8, 83/951, 937, 884, 483, 74, 75, 363, 365, 83/369, 368, 370, 56, 955, 498, 504; 156/133, 64, 123, 523, 406.4, 156/906–907; 271/226, 227; 242/523.1, 242/527

See application file for complete search history.

(56) References Cited

U.S. PATENT DOCUMENTS 1,743,059 A * 1/1930 Brown ............................. 83/234
3,406,601 A * 10/1968 Clifford ............................ 83/72
(Continued)

FOREIGN PATENT DOCUMENTS

JP  01171793 A * 7/1989 ............... B26D 1/18
JP  6-106653     4/1994
(Continued)

OTHER PUBLICATIONS

English translation of JP 6-106653 dated Apr. 19, 1994.

*Primary Examiner* — Kenneth E. Peterson
*Assistant Examiner* — Samuel A Davies
(74) *Attorney, Agent, or Firm* — Ladas & Parry LLP (57) ABSTRACT

The invention relates to a cutting device for, in a cutting direction, cutting a belt layer from a web of unvulcanised rubber having mutually substantially parallel cords that are at a cord angle, comprising: a blade which sideward with respect to the cutting direction, is freely movable; a first detector for during cutting detecting a sideward displacement of the +0d5; a control computer, operationally coupled to the first detector, for giving control instructions on the basis of displacement information from the detecting means regarding sideward displacement of the +0d5; at least one actuator, operationally coupled to the control means for during cutting adjusting the cutting direction of the +0d5 on the basis of the control instructions.

14 Claims, 9 Drawing Sheets

(56) References Cited

U.S. PATENT DOCUMENTS

| | | | |
|---|---|---|---|
| 3,429,490 A * | 2/1969 | Cantarutti | 225/94 |
| 3,859,152 A * | 1/1975 | Brey et al. | 156/88 |
| 3,867,228 A * | 2/1975 | Brinkley et al. | 156/397 |
| 4,010,664 A * | 3/1977 | Marshall | 83/277 |
| 4,296,662 A * | 10/1981 | Reed et al. | 83/880 |
| 4,331,051 A * | 5/1982 | Gerber et al. | 83/74 |
| 4,781,094 A * | 11/1988 | Moretti | 83/488 |
| 4,809,754 A * | 3/1989 | Barnes | 144/392 |
| 4,823,662 A * | 4/1989 | Stolzer | 83/150 |
| 4,857,123 A * | 8/1989 | Still et al. | 156/133 |
| 4,941,100 A * | 7/1990 | McFarlane et al. | 700/167 |
| 4,961,813 A * | 10/1990 | Bailey | 156/406.4 |
| 4,965,733 A * | 10/1990 | Kimura et al. | 700/167 |
| 5,029,502 A * | 7/1991 | Irie | 83/49 |
| 5,092,946 A * | 3/1992 | Okuyama et al. | 156/64 |
| 5,145,542 A * | 9/1992 | Tanaka et al. | 156/159 |
| 5,327,353 A * | 7/1994 | Nagano | 700/167 |
| 5,465,639 A * | 11/1995 | Senbokuya | 83/34 |
| 5,582,664 A * | 12/1996 | Sergel et al. | 156/64 |
| 5,720,837 A * | 2/1998 | Regterschot et al. | 156/123 |
| 5,904,788 A * | 5/1999 | Kitajima et al. | 156/64 |
| 6,547,906 B1 * | 4/2003 | Kolker et al. | 156/123 |
| 6,681,672 B2 * | 1/2004 | Myrfield | 83/367 |
| 6,695,949 B1 * | 2/2004 | Jungk et al. | 156/406.4 |
| 6,796,354 B2 * | 9/2004 | Nauta et al. | 156/558 |
| 6,913,058 B1 * | 7/2005 | Takagi | 156/397 |
| 7,028,384 B2 * | 4/2006 | Mehri et al. | 29/564.6 |
| 7,077,120 B2 * | 7/2006 | Funakoshi et al. | 125/13.01 |
| 7,138,021 B2 * | 11/2006 | Auclair | 156/64 |
| 7,182,008 B2 * | 2/2007 | Negishi et al. | 83/15 |
| 7,833,367 B2 * | 11/2010 | Yamamoto et al. | 156/64 |
| 2001/0037837 A1 * | 11/2001 | Miyashita et al. | 138/178 |
| 2001/0045148 A1 * | 11/2001 | Gerent et al. | 83/49 |
| 2002/0017174 A1 * | 2/2002 | Gammerler et al. | 83/13 |
| 2002/0078807 A1 * | 6/2002 | Keyser | 83/86 |
| 2003/0140750 A1 * | 7/2003 | Hoffmann et al. | 83/74 |
| 2007/0012147 A1 * | 1/2007 | Kawai et al. | 83/72 |
| 2007/0028734 A1 * | 2/2007 | Sekiya | 83/72 |
| 2008/0308232 A1 * | 12/2008 | Lovell et al. | 156/406.4 |
| 2009/0133554 A1 * | 5/2009 | Pan | 83/72 |
| 2011/0084442 A1 * | 4/2011 | Ogata et al. | 271/227 |

FOREIGN PATENT DOCUMENTS

| | | | | |
|---|---|---|---|---|
| JP | 06106653 A | * | 4/1994 | B29D 30/46 |
| JP | 2006334715 A | * | 12/2006 | B26D 1/14 |
| JP | 2007001068 A | * | 1/2007 | B29D 30/46 |

\* cited by examiner

CUTTING DEVICE

The invention relates to a cutting device for cutting a belt layer from a web of unvulcanised rubber having mutually substantially parallel cords that are at a cord angle.

Such cutting devices are known from U.S. Pat. Nos. 4,965,733, 5,092,946 and 5,327,353 wherein a circular blade is mounted on a blade axis. The blade itself has a fixed position on the blade axis. The blade axis is mounted on a holder which in turn is mounted in a frame. The cutting devices are provided with a first position detecting device for detecting the position of the blade holder in the frame, that means in the direction of the cut of the blade, and a second position detecting device for detecting the rotation of the blade holder with respect to the frame.

In U.S. Pat. No. 5,327,353 the measurement results of the position detecting devices are used for determining whether the actual position of the blade corresponds with a predetermined cutting direction. In addition the height of the blade holder is also measured by means of a third position detecting device. When it is established that too large a deviation occurs, it is concluded that the blade no longer follows the cords, particularly that the blade crosses a cord, and an alarm signal is given.

In U.S. Pat. No. 4,965,733 the measurement results of the position detecting devices are entered into a digital calculation unit which determines the realised cutting line.

In U.S. Pat. No. 5,092,946 the cutting device of U.S. Pat. No. 4,965,733 is used in a device for arranging belt layers on a building drum, in order to determine whether the shape of the diagonal side (hypotenuse) of a belt layer needs to be corrected.

A problem with the devices mentioned in the U.S. patents is that the adjustment of the device for arranging the belt layers has to be done manually and has to be corrected.

JP-A-06 106653 describes, as far as known, a cutting device having a blade in a blade holder that is rotatable. The blade holder is mounted on a rotatable frame connected to a control computer. A detecting device detects the displacement of the blade holder, and when the displacement is larger than the set value the control computer orders a motor to rotate the frame. However this turns out to be too slow and incapable of properly following the cords.

A problem particularly with the cutting devices mentioned above is that the blades are not always capable of correctly following the cords, despite the measures taken.

It is an object of the invention to provide an improved cutting device.

It is an object of the invention to provide a cutting device that is capable of following the course of the cords better than has been possible up until now.

It is a further object of the invention to provide an improved device for arranging belt layers.

To that end the invention regards a cutting device for, in a cutting direction, cutting a belt layer from a web of unvulcanised rubber having mutually substantially parallel cords that are at a cord angle, comprising:
- a blade which sideward with respect to the cutting direction, is freely movable;
- a displacement detector for during cutting detecting a sideward displacement of the blade;
- a control computer, operationally coupled to the displacement detector, for giving control instructions on the basis of displacement information from the detecting means regarding sideward displacement of the blade;
- at least one actuator, operationally coupled to the control means for during cutting adjusting the cutting direction of the blade on the basis of the control instructions.

Because in the cutting device according to the invention the blade itself is displaceable in sideward direction and the displacement detectors is present for measuring (changes of) the location of the blade itself, a simple cutting device is provided wherein the actual course of the cutting line can very easily be detected. Moreover the reliability and the speed are improved due to the simple structure.

It has in particular turned out to be possible to properly follow the cords because the measurement results of the displacement detectors are fed back into an actuator able to adjust the cutting direction of the blade.

In one embodiment of the cutting device the displacement detector is adapted for almost continuously detecting sideward displacement.

In an embodiment thereof the displacement detector is operationally coupled to the control computer for on the basis of displacement during cutting giving control instructions. Particularly each displacement is directly fed back to control computer, and the control computer gives instructions for directly following the displacement. As a result the blade will hardly change position with respect to the rest of the cutting device, yet will indeed follow the course of a cord.

In one embodiment the blade is freely displaceable perpendicular to the cutting direction.

In one embodiment the blade is a circular blade on a blade axle.

In one embodiment the blade is displaceable on the blade axle.

In an embodiment thereof the circular blade is freely slidable over the blade axle, resulting in a very simple structure. Moreover the mass to be displaced is minimal, and the blade is capable of moving quickly.

In an embodiment thereof the cutting device further comprises a frame wherein the blade is mounted so as to be displaceable in the cutting direction, wherein the frame is rotatable about an axis of rotation that intersects the cutting line perpendicularly, and is perpendicular to the belt layer.

In an embodiment thereof the axis of rotation intersects the centre of the width of the belt layer.

In an embodiment thereof the actuator is connected to the frame in order to rotate the frame about the axis of rotation. The actuator in particular rotates the frame in order to directly follow the displacement of the blade. That means that the frame rotates in the direction of the displacement of the blade. As already stated the blade will hardly be displaced with respect to the frame as a result.

In an embodiment thereof the frame is frame-shaped having an upper frame member and a lower frame member, and the blade is attached so as to be movable along the upper frame member.

In an embodiment of the cutting device according to the invention the blade is provided with heating means for heating the blade.

By rendering: the blade freely displaceable in sideward direction, determining whether the blade is displacing sideward during cutting and once establishing a sideward displacement immediately adjusting the cutting angle, it has turned out to be possible to cut along the cords and to follow them accurately. Moreover, when the position of the blade is detected, the exact cutting line can be determined therefrom.

Heating the blade improves following the cords even more.

According to another aspect the invention further relates to a cutting device for, in a cutting direction, cutting a belt layer from a web of unvulcanised rubber having mutually substantially parallel cords that are at a cord angle, comprising cord following means for following a cord during cutting, and detecting means for detecting the resulting course of the cutting line during cutting.

In an embodiment of said cutting device the cord following means comprise an actuator for during cutting adjusting the cutting direction.

In an embodiment of said cutting device the cord following means comprise sensing means for sensing a cord and which are operationally coupled to the actuator.

In an embodiment of this cutting device the sensing means are adapted for sensing a change of the direction of a cord, and preferably are operationally coupled to the actuator, the actuator giving a signal to change the cutting direction in order to follow the changed cord direction when a change of the direction of the cord is detected.

The invention further relates to a device for arranging a belt layer provided with parallel cords on a building drum, particularly for a broad tyre such as a truck tyre, comprising:

a cutting device for cutting a belt layer from a web at a cutting angle along a cutting line along a cord, for obtaining a substantially parallelogram-shaped belt layer having a leading diagonal side and a trailing diagonal side and cords at a cord angle that is almost parallel to the diagonal sides and the cutting angle;

a belt layer length sensor for measuring the belt layer length;

a control computer, operationally coupled to the belt layer length sensors and provided with a memory for storing a set cord angle, belt layer width and belt layer length, provided with software routines for comparing the measured cutting line with the set cord angle and belt layer width, and the measured belt layer length with the set belt layer length and the giving of reference values and control signals based on the reference values;

an applicator for arranging the belt layer on the building drum with the trailing diagonal side parallel to the leading diagonal side, and operationally coupled to the control computer for receiving control signals therefrom.

By selecting a control computer that compares the measurement values with the set values it has turned out to be possible to automate the tuning and adjustment of the device which in itself and due to its nature is complex to a large extent.

In an embodiment of the device according to the invention wherein the belt layer has a centre line, the applicator is adapted for arranging the belt layer on the building drum with the centre line of the leading part and the centre line of the trailing part opposite each other in line.

In a further embodiment the applicator is adapted for arranging the trailing diagonal side in a butting way against the leading diagonal side. Particularly when the centre lines are opposite each other in line, the ends butting each other, it is possible to realise the optimal belt layer. Particularly when moreover the cutting lines realised at the leading side and the trailing side are known an optimal belt layer can be made around a building drum.

In an embodiment the applicator comprises a conveying device having driving means, a supply side and a discharge side, for conveying the belt layer in a conveyance direction from the cutting device at the supply side to the building drum at the discharge side, wherein the conveying device comprises a retaining means for retaining a segment of the belt layer on the conveying device free of shifting sidewards with respect to the conveyance direction.

In a further embodiment thereof the retaining means is adapted for retaining the entire belt layer. In an embodiment thereof the conveying device comprises a conveyor belt and the retaining means comprises magnets or electromagnets for retaining belt layers having steel cords onto the conveyor belt or a vacuum device or pressing means for retaining belt layers provided with other types of cords. In an embodiment the retaining means can be switched on and off. The retaining means is then operationally coupled to the control computer, the control computer giving control signals to the retaining means for switching it on and off.

In an embodiment the device further comprises a supply device for displacing the web to the cutting device, and after cutting displacing the belt layer cut from the web to the supply side of the conveying device at a discharge side of the supply device.

In an embodiment the supply side of the conveying device and the discharge side of the supply device are displaceable with respect to each other laterally with respect to the conveying device and parallel to the axis of rotation of the building drum, particularly during conveying a belt layer. The supply device is equipped with an actuator for that purpose. In an embodiment the actuator is coupled to the control computer. The control computer gives control signals to the actuator when the reference values show differences between the set values and the values determined by means of the displacement detector and belt layer length sensor.

In a further embodiment of the device the applicator comprises a first measuring device for measuring the shape of the cutting line of the leading diagonal side, and said measuring device is operationally coupled to the control computer.

In an embodiment thereof the applicator comprises a second measuring device, operationally coupled to the control computer, for measuring the length of a belt layer. Said sensor particularly comprises an encoder and means for reading the encoder for determining the displacement distance, and an image recorder for determining when the leading and trailing ends of the belt layer pass the sensor.

In one embodiment the control computer is operationally coupled to the driving means and the building drum drive for mutually adjusting the winding speed of the building drum and the conveyance speed of the conveying device based on the length and the shape of the leading and trailing cutting lines of the belt layer.

In an embodiment the cutting device is provided with a blade and detectors for detecting the position of the blade during cutting, wherein the detectors are operationally coupled to the control computer. The control computer is provided with software having a cutting line calculation routine for calculating the realised cutting line from the determinations of the blade position during cutting. Particularly when the cord position in the belt layer is known the ends of the belt layer can be placed in optimal abutment on the building drum, the cords almost parallel and without so-called "dog -ears".

In an embodiment thereof the cutting device comprises a rotation driving device for having the cutting angle adjusted during cutting, wherein the rotation driving device is operationally coupled to the control computer for adjusting the cutting angle.

In an embodiment thereof the blade is freely movable during cutting in sideward direction with respect to the cutting line, and the cutting device is provided with a displacement detector for detecting the sideward position of the blade.

In an embodiment thereof the displacement detector is operationally coupled to the control computer, for when detecting a change in the sideward position having the control computer give a control signal to the rotation driving device for adjusting the cutting angle. For that purpose the software of the control computer is provided with a cutting routine for determining a sideward displacement of the blade from measurement values from the displacement detector and giving control instructions to the rotation driving device related to the sideward displacement.

In an embodiment thereof the cutting device is provided with a blade that is freely movable perpendicular to the cutting direction, a displacement detector for detecting the sideward position of the blade, and a rotation driving device for having the blade rotate about an axis perpendicular to the belt layer that is being cut, wherein the location sensor is operationally coupled to the rotation driving device for in response to a displacement of the blade detected by the location sensor activating the rotation driving device.

In an embodiment thereof the cutting device further comprises a location detector for detecting the position of the blade along the cutting line, and wherein the rotation driving device and the first location sensor are operationally coupled to the control computer for providing location information, and the control computer further comprises a cutting line calculation routine for calculating the shape of the cutting line from the location information from the displacement and location detectors.

The invention further relates to a method for arranging a belt layer provided with parallel cords on a building drum, particularly for a broad tyre such as a truck tyre, using a device according to an embodiment described above, further provided with a supply device, comprising the following steps:
a. setting a cord angle, a belt layer length and a belt layer width in the control computer of the device;
b. supplying a web on a roll, wherein the front side of the web is arranged on the supply device;
c. activating the device;
after which subsequently:
d. the supply device conveys the web to the cutting device, wherein the front side of the web is conveyed a belt layer length past the cutting line of the cutting device;
e. the cutting device cuts a belt layer from the web at the set cutting line, wherein the first sensor measures the cutting line during cutting, wherein the measured values of the cutting line are entered into the control computer;
f. the cut belt layer is passed past the second sensor whereby the belt layer length is measured, which measured belt layer length is entered into the control computer;
g. the control computer compares the measured cutting line and belt layer length with the set values for the cord angle, belt layer length and belt layer width;
h. the control computer performs a calibration on the supply device, the cutting device and the applicator based on the differences between the set values and the measured values;
i. the first belt layer is removed from the device;
after which the steps d. up to and including h. are repeated until the roll is finished.

In case of a large tyre such as for instance a truck tyre, the abutment of the ends of the belt layers, which in such tyres are very broad as a result of which the diagonal sides have a considerable length, is critical as a small deviation at an end results in a large deviation at the opposite end of a diagonal side.

The invention further relates to a cutting device for, in a cutting direction, cutting a belt layer from a web of unvulcanised rubber having mutually substantially parallel cords that are at a cord angle, comprising:
a blade which perpendicular to the cutting direction is freely movable;
a displacement detector for during cutting detecting a sideward displacement of the blade;
a control computer, operationally coupled to the displacement detector, for giving control instructions based on the displacement information from the detecting means regarding the displacement of the blade;
at least one actuator, operationally coupled to the control means, for during cutting directly following the cutting direction of the blade based on the control instructions.

Alternatively the invention relates to a cutting device for, in a cutting direction, cutting a belt layer from a web of unvulcanised rubber having mutually substantially parallel cords that are at a cord angle, comprising:
a blade which sideward with respect to the cutting direction is freely movable;
a displacement detector for during cutting detecting a sideward displacement of the blade;
a control computer, operationally coupled to the displacement detector, for giving control instructions based on the displacement information from the detecting means regarding the displacement of the blade;
at least one actuator, operationally coupled to the control means, for during cutting directly following the cutting direction of the blade based on the control instructions.

The invention furthermore relates to a cutting device for, in a cutting direction, cutting a belt layer from a web of unvulcanised rubber having mutually substantially parallel cords that are at a cord angle, comprising:
a circular blade on a blade axle that is freely slidable over the blade axle;
a displacement detector for during cutting detecting a sideward displacement of the circular blade;
a control computer, operationally coupled to the displacement detector, for giving control instructions based on displacement information from the detecting means regarding the displacement of the circular blade;
at least one actuator, operationally coupled to the control means, for during cutting directly following the cutting direction of the blade based on the control instructions.

Particularly in all the embodiments described above in an embodiment the displacement detector is fixedly connected to the cutting device and said detector detects displacement of the blade with respect to the further cutting device. In addition a further detector detects the position or orientation of the cutting device with respect to a centre line of a belt layer to be cut, or with respect to a cutting table or conveying device on which a belt layer to be cut sits during cutting.

Furthermore the characteristics described above can be combined for a further optimisation of the cutting device and the method.

The invention will be further elucidated on the basis of an exemplary embodiment of a device for arranging a belt layer, and a cutting device for it, according to the invention, in which.

Figure 1:
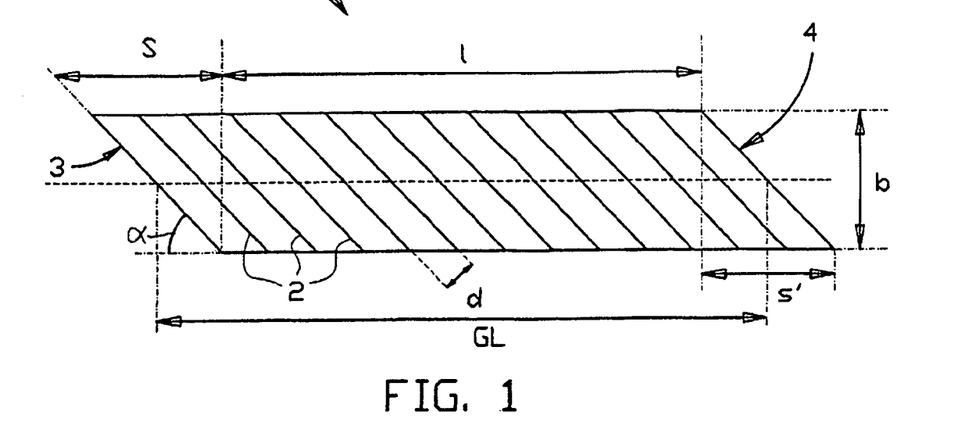
FIG. 1 shows a belt layer.

FIG. 1 shows a top view of a belt layer 1 of unvulcanised rubber having cords 2 incorporated therein. Such a belt layer has a leading end 3, a trailing end 4, a width b and a cord angle α. The cords 2 have a mutual cord distance d. The belt layer 1 has a rectangular part having a length l and a tip having tip length s. The belt layer has a longitudinal axis (indicated with a dotted line) and a belt layer length GL.

Figure 2:
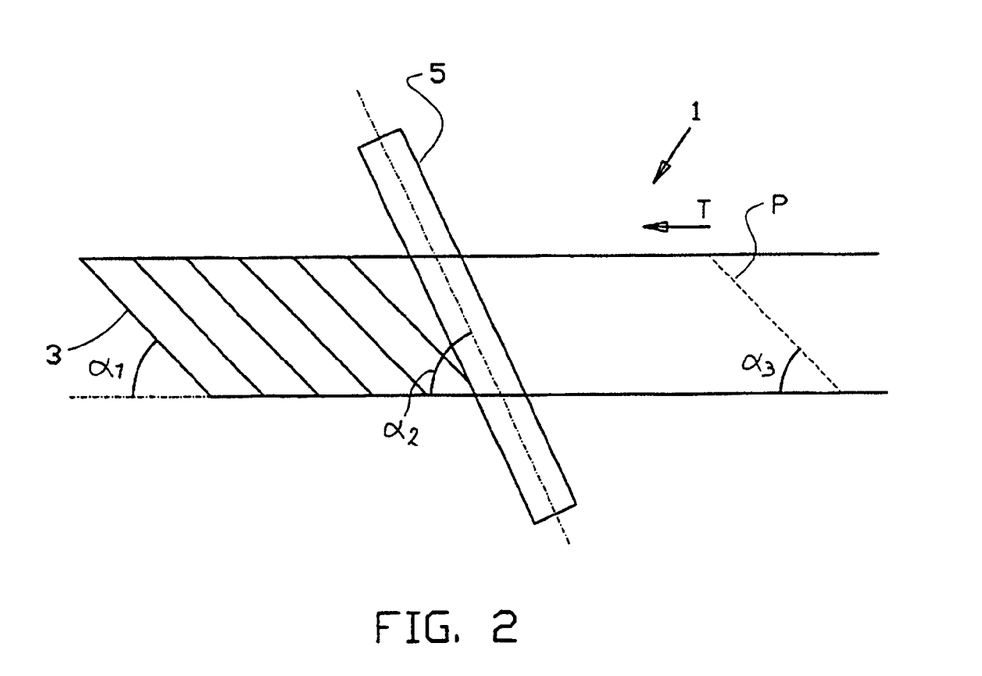
FIG. 2 shows a belt layer with cutting device and several relevant angles.

FIG. 2 shows a belt layer having a cutting device 5 depicted therein, a cutting angle a1 of the leading end 3 of the belt layer 1. The belt layer 1 is cut off from a continuous strip that passes under cutting device 5 in a conveyance direction T. The cutting device is still positioned at an angle a1. At the position P, indicated with a dotted line, the strip will be cut at an angle a3 to form the belt layer 1.

Figure 3A:
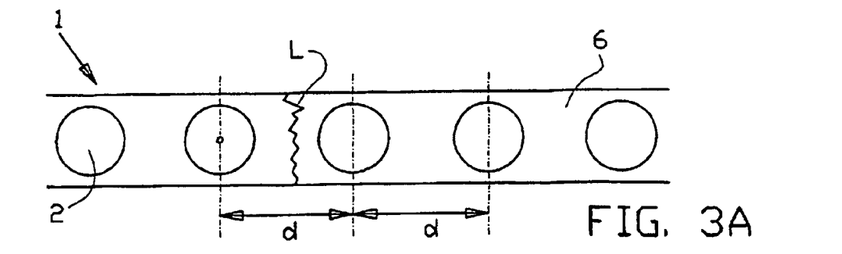
FIGS. 3A-C show possibilities for a splice of a belt layer, in cross-section of the belt layer.

FIG. 3A shows a small part of a belt layer wrapped around a building drum, in cross-section perpendicular to the cords, wherein the leading end and the trailing end in a butt splice L is made correctly. In the cross-section of the belt layer 1 the unvulcanised rubber 6 and the cords 2 are shown. The cord distance d at the location of the splice is just as large as the cord distance d in the rest of the belt layer.

FIG. 3B again shows a cross-section of a belt layer 1 once arranged on the drum in the same way as in FIG. 3A, wherein this time the distance between two cords 2a and 2b between which splice L is made is twice the cord distance d. This is the maximum allowable situation according to regulations.

Figure 3B:
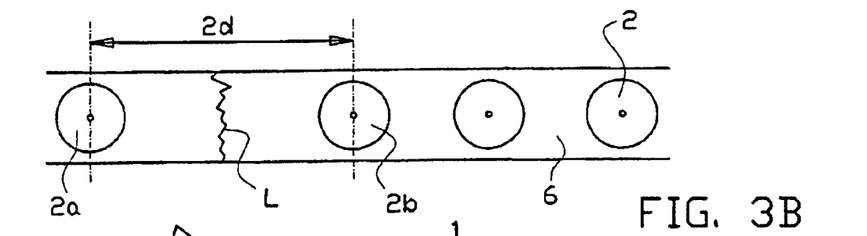
Figure 3C:
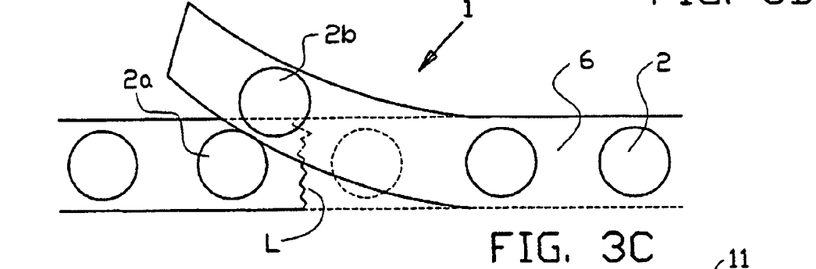

FIG. 3C shows the same cross-section as in FIGS. 3A and 3B, however, with an unallowable situation wherein two cords 2a and 2b lie over each other. There is an overlap. For the sake of clarity the desired situation is shown in dotted lines. In a tyre this will result in an unequal distribution of weight and a bulge in the tyre. It is among other things an object of the invention to make a splice which corresponds as much as possible with the splice as shown in FIG. 3A, the situation shown in FIG. 3B being the ultimate and avoiding the situation of FIG. 3C.

Figure 4:
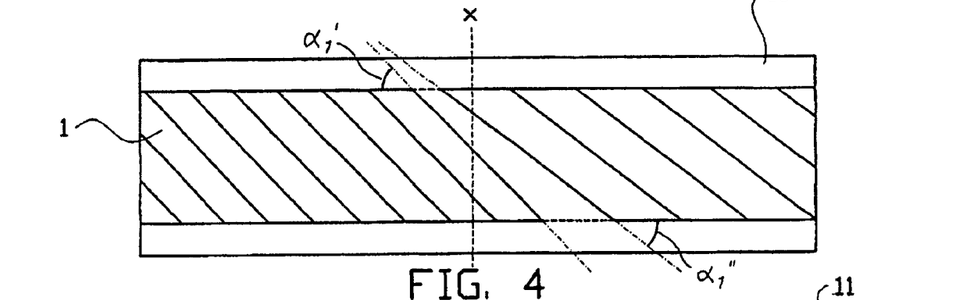
FIG. 4 shows a splice according to the known principle.

FIG. 4 shows the old way of placing the belt layer ends against each other on the drum 11. In that case the tip of the trailing side 4 of belt layer 1 was cut at cutting angle $\alpha_1''$, butting against the obtuse angle of the leading side 3 that is cut at cutting angle $\alpha_1'$. It will be clear that in this situation there will always be space left between the ends 3, 4 due to the unequal cutting angles. The cutting angles may be unequal due to deviations in the cutting device, or due to deviations in the cord angle, or due to deformations during conveyance or stress in the material.

Figure 5:
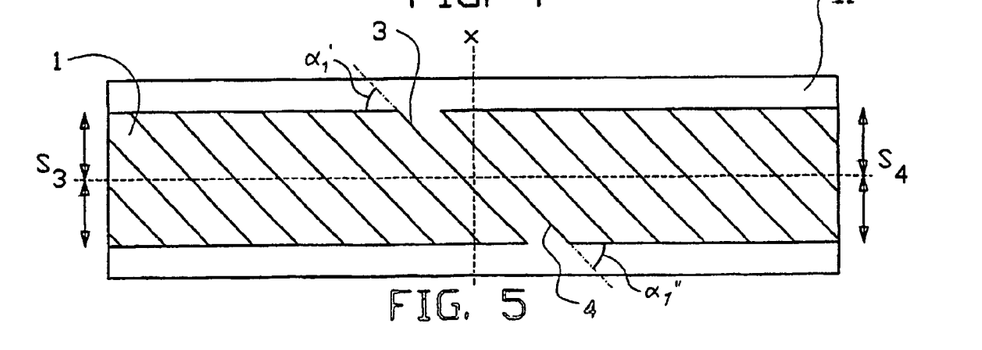
FIG. 5 shows a splice according to a principle of an aspect of the invention.

FIG. 5 shows the situation according to the invention, wherein due to the total measurement of the shape of the belt layer 1 and the exact knowledge of the position and the course of the cords a better splice possible.

The belt layer 1 is in this case again almost arranged around building drum 11. The centre S3 of the leading side 3 and the centre S4 of the trailing side 4 were placed opposite each other and the cords of the leading side 3 and the trailing side 4 were placed parallel, for instance in a manner as explained in FIGS. 6A-6H, so that a possible remaining splice opening is in any case a parallel opening. As a result in any case no overlap will arise and it is possible to have the ends abut each other directly.

FIGS. 6A-6H consecutively shows the different steps of the device according to the invention when operative, seen from above.

Figure 6A:
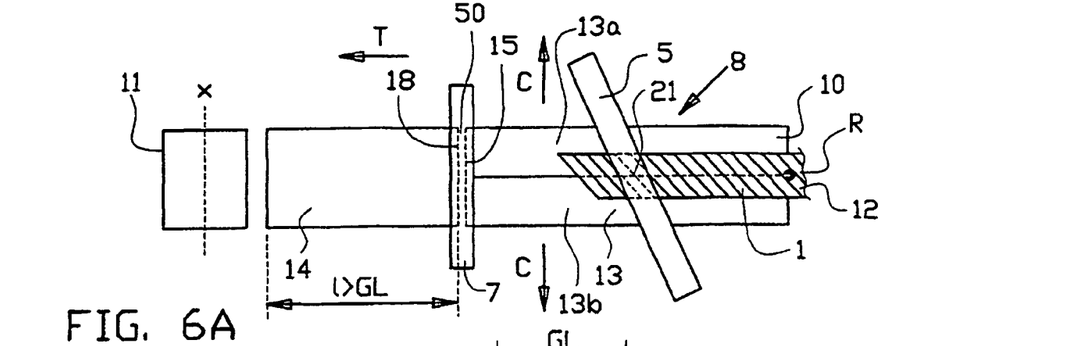
FIGS. 6A-6H show the belt layer application device when operative.

FIG. 6A shows a belt layer application device according to the invention. The figure shows a building drum 11 having axis of rotation x and a conveying device 8 provided with a cutting device 5. At the supply side 10 a continuous strip 12 is supplied in the direction T by supply device 8, past the cutting device 5.

Conveying device 8 consists of a first feed conveying device 13, in this case a conveyor belt, particularly two parallel conveyor belts 13a and 13b, which pass the continuous strip 12 past the cutting device 5, followed by a discharge conveyor belt 14. The feed conveying device 13 is furthermore provided with a turn or rotation point R as a result of which the discharge side 15 of the feed conveying device 13 is capable of moving transverse to the conveyance direction T with respect to the feed side 18 of the discharge conveyor belt 14 and reciprocally (indicated with arrows C) in the plane of the belt layer. In an alternative embodiment the feed conveying device 13 and discharge conveyor belt 14 are capable of lateral movement with respect to each other.

In FIG. 6A it is furthermore indicated that the length of the discharge conveying device 14 is larger than the belt layer length GL, as a result of which during the arrangement of a belt layer the feed conveying device 13 is free to produce the next belt layer. Moreover the length of the feed conveying device 13 between the discharge side 15 and the cutting device 5 is also larger than GL. As a result a belt layer can be arranged around a building drum and simultaneously a next belt layer can be cut.

Figure 6B:
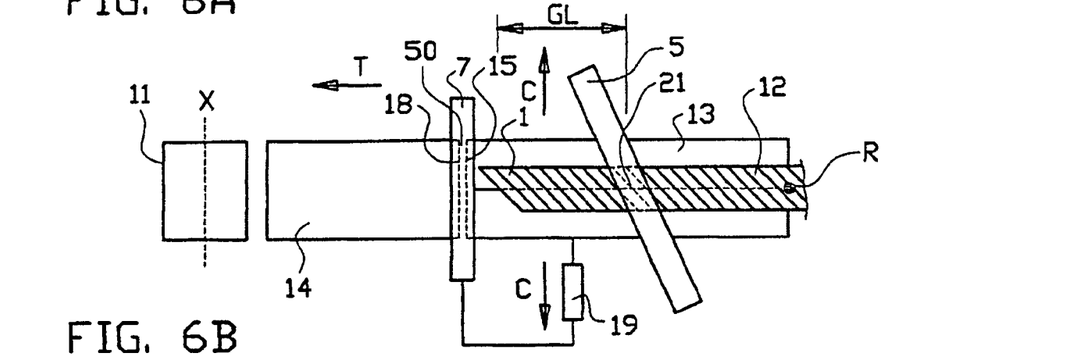

FIG. 6B shows the situation in the process wherein the continuous strip 12 has been passed past the cutting device 5 with the set belt layer length GL and the cutting device 5 is going to cut the continuous strip 12 as soon as the desired length has been passed so that after cutting a belt layer 1 is created. This figure also shows the position of the measurement device 7, preferably a (digital) camera or line scan camera, for measuring the strip while it passes by. The measurement device 7 is positioned at a transition 50 between conveying device 13 and conveyor belt 14. In this case a camera is positioned below the transition with a light beam above it.

During conveyance the end 15 of the conveyor belt 13 will reciprocate (if necessary) about axis of rotation R with respect to the feed side 18 of conveyor belt 14, driven by means of driving motor 19 in order to properly position the strip and possible adapt the shape on the conveyor belt 14. By means of magnets (in case of steel cord reinforcement) the strip (in the end belt layer) is secured to the conveyor belt 14. Driving motor 19 is, optionally via a computer or another control device, operationally coupled to measurement device 7.

Figure 6C:
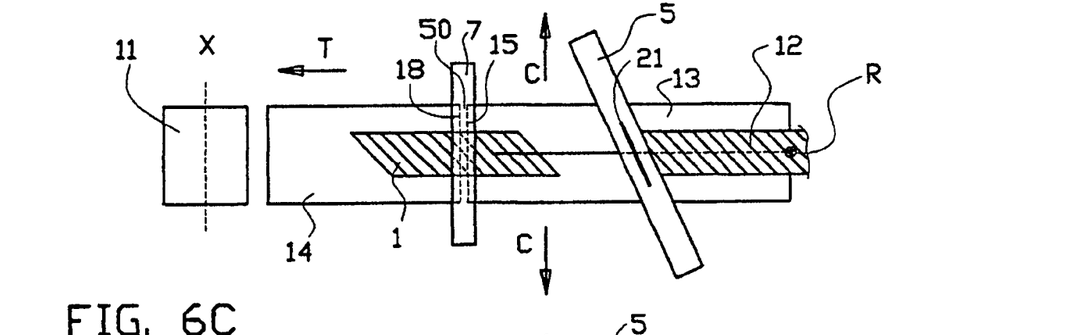

FIG. 6C shows the situation wherein the strip 12 is cut and a part of the belt layer 1 has already passed by the measurement device 7 and has been measured.

Figure 6D:
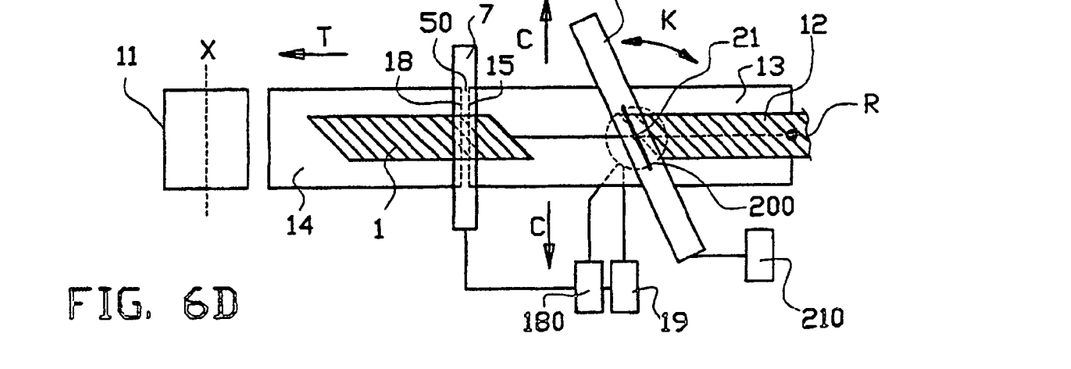

FIG. 6D shows the situation in which the cutting device 5 is cutting the strip, wherein the strip does not move. The cutting line of the cutting device 5 is measured meanwhile, whereas the measurement values are also used again to regulate the cutting direction of the cutting device. The measurement values are detected by means of location detectors 210 that are coupled to the control unit 180. The control unit calculates whether a correction of the cutting angle is necessary, and forwards possible corrections to the actuator 200 which adjust the cutting angle of the cutting device 5 by rotation of the cutting device, indicated with arrow K. By detecting the position of the blade it is known exactly what the course of the cut and the cords actually is, which will become clear from the description of the cutting device further below.

Figure 6E:
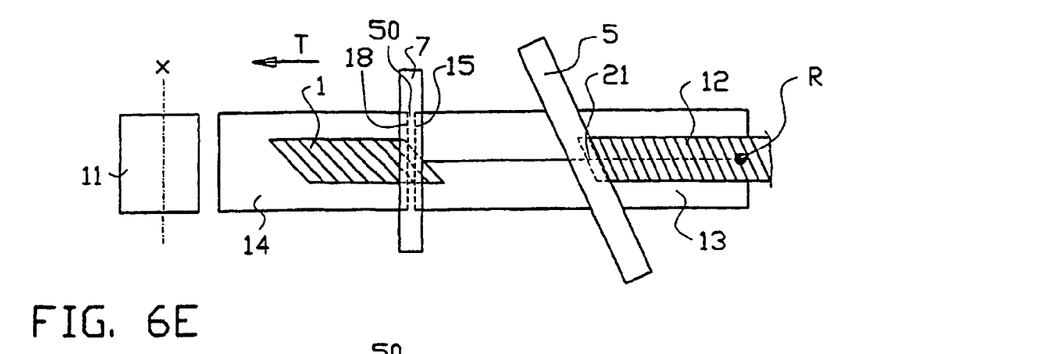

FIG. 6E shows the situation wherein a belt layer 1 has been cut from the strip 12 and the belt layer 1 is conveyed in the direction T by means of conveyor belt 14 whereas the rest of the continuous strip remains at the cutting device 5. The entire belt layer has been placed on the discharge conveying device 14 and is secured thereon.

Figure 6F:
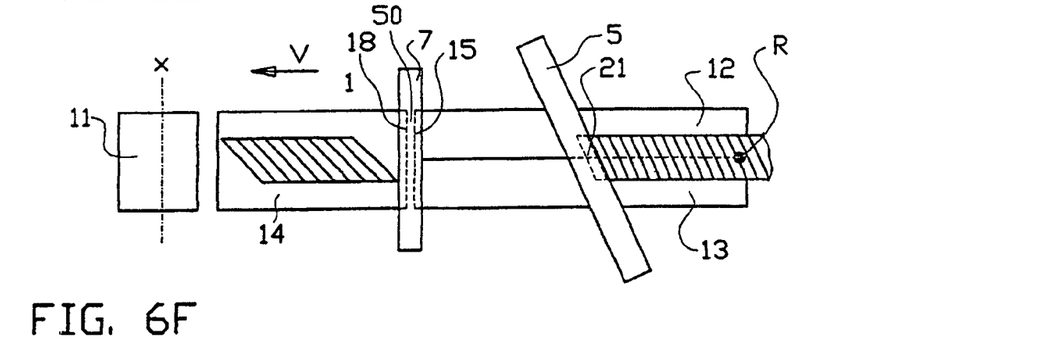

FIG. 6F shows the situation wherein the belt layer 1 is supplied to the drum 11. For that purpose the conveyor belt 14 is moved in its entirety towards the building drum 11 in the direction V whereas the belt layer is secured thereon. During the application the position of the belt layer is no longer changed. The belt layer is secured here on the discharge conveying device 14. The discharge conveying device 14 applies the belt layer 1 against the lower side of the drum. Alternatively the belt layer 1 can also be at the lower side of the conveyor belt 14 and be applied against the upper side of the drum.

Figure 6G:
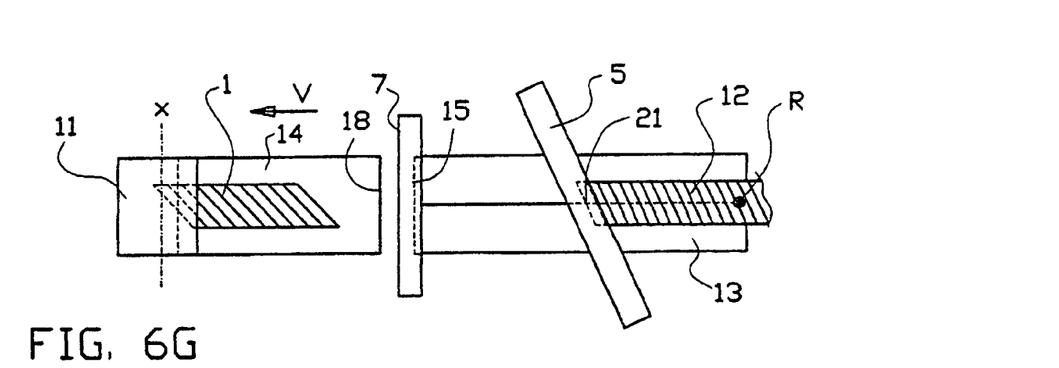

In FIG. 6G the building drum 11 is brought into rotation, whereas the conveyor belt 14 is near the building drum and applies the belt layer against the building drum. In this situation for this belt layer, the belt layer is situated on the conveyor belt and the conveyor belt is situated near the lower side of the building drum.

Figure 6H:
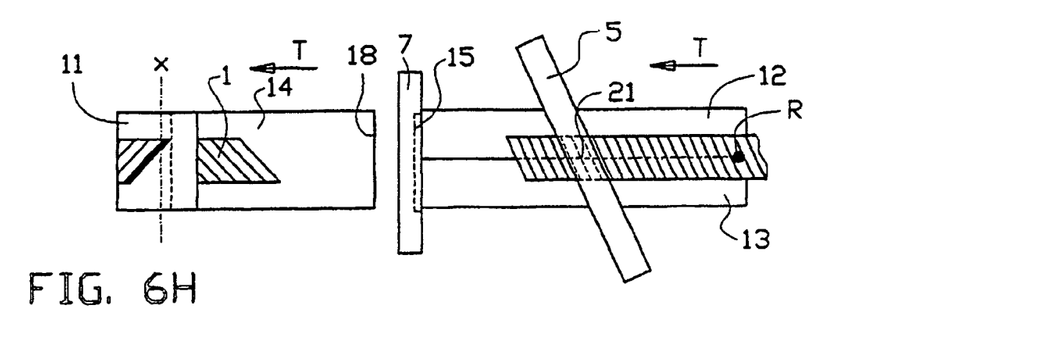

In FIG. 6H the belt layer 1 is almost entirely wrapped around the building drum 11. Meanwhile the strip 12 can be conveyed further in order to cut off the next belt layer. The discharge conveyor device 14 subsequently returns to the initial position and the process can be repeated.

The operation of the device according to the invention is as follows. When a new roll of continuous rubber material provided with cords at a cord angle is placed on the machine, the desired belt layer length, the width of the belt layer and the cord angle are set in the control computer 180.

The beginning of the web is passed underneath the cutting device and a first cut is made. The web is subsequently conveyed past the cutting device wherein a measured-out length passes the cutting device. After cutting, the length is measured.

The measured belt layer length and the cutting lines that have been measured during the cutting are compared to the set cutting angle and the set belt layer length. The first belt layer that is cut, is subsequently taken from the conveyor belt by an operator if the measured value does not correspond to the set value. The process is repeated with adjusted machine settings (adjusted by the control computer on the basis of comparison of the measured values to the set values), until the measured values do correspond (within tolerance) to the set values after which the machine has in fact been tuned and is able to produce the actual length desired: From the difference between the measured and the set belt layer length and the difference between the set cord angle and the measured cutting lines the conveying distance of the web is calculated, for making the next belt layer.

By each time measuring the belt layer length and the cutting line, and comparing them to the set value, and optionally a previous measured value or carrying out a trend analysis while using the previous measured values, the belt layer length and the shape of the belt layers can become more and more accurate by each time adjusting the conveying distance.

The first belt layer is used in the manner described above for tuning the device, which tuning takes place fully automatically. In each next belt layer the measured values are compared with the target values, and optionally the machine settings are further adjusted.

Figure 7:
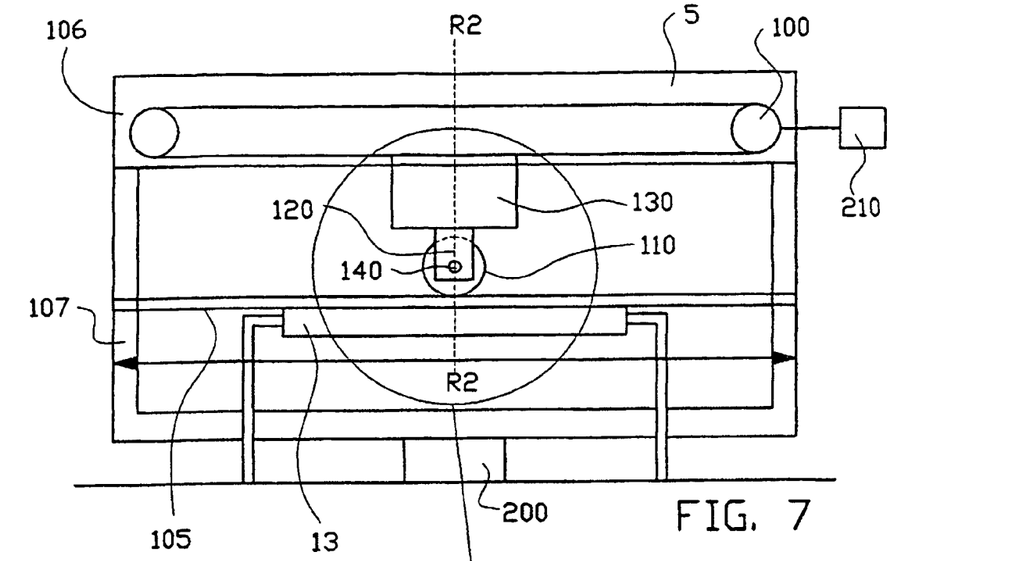
FIG. 7 shows a cutting device according to another aspect of the invention.

FIG. 7 shows a front view of a cutting device 5 according to the invention. The cutting device is provided with a circular blade 110 on a blade axle 140 in a blade holder 120. The blade holder 120 is attached to an attachment body.

The cutting device furthermore has a frame 107 that in this case passed underneath the conveyor belt 13. The frame rests in this case on an actuator 200 that is capable of having the frame rotate about an axis R2 perpendicular to the cutting plane and in the middle through conveyor belt 13. The frame has an upper beam 106. The cutting device furthermore has a cut ruler 105 that runs over the conveyor belt 13 and underneath a belt layer to be cut.

The attachment body 130 is mounted to the upper beam 106 so as to be movable along upper beam 106 and is driven by means of drive 100. Location detectors detect the position of the centre of the blade 110 (in this case near R2) with respect to the conveyor belt 13. In a simple embodiment for instance the course of drive 100 can be detected.

The position (cutting angle) of the frame 107 with respect to the conveyor belt 13 can be determined for instance from the actuator 200 in a simple embodiment.

In an alternative embodiment of the cutting device two attachment bodies 130 and 130' are mounted one after the other each having a blade, wherein the cutting lines of both blades are in line with each other. When the cutting device starts cutting in the centre of a continuous strip, both attachment bodies 130 and 130' are able to move to one side each so that each blade cuts one half of a strip. In this way the cutting motion can be made in half the time, which may result in a considerable gain in production efficiency. The control of the rotation device can be coupled to one of either blades, that means one of either blades can be provided with a displacement detector for sideward displacement and said displacement detector can be coupled to the control device. In an alternative embodiment both blades can be provided with location detectors for sideward displacement. The control device is able to average both values from both detectors and control the frame, that means its rotation, based on said average values. The idea is that when a deviation occurs in the cord direction, this will be counteracted by way of this cutting direction.

Figure 8:
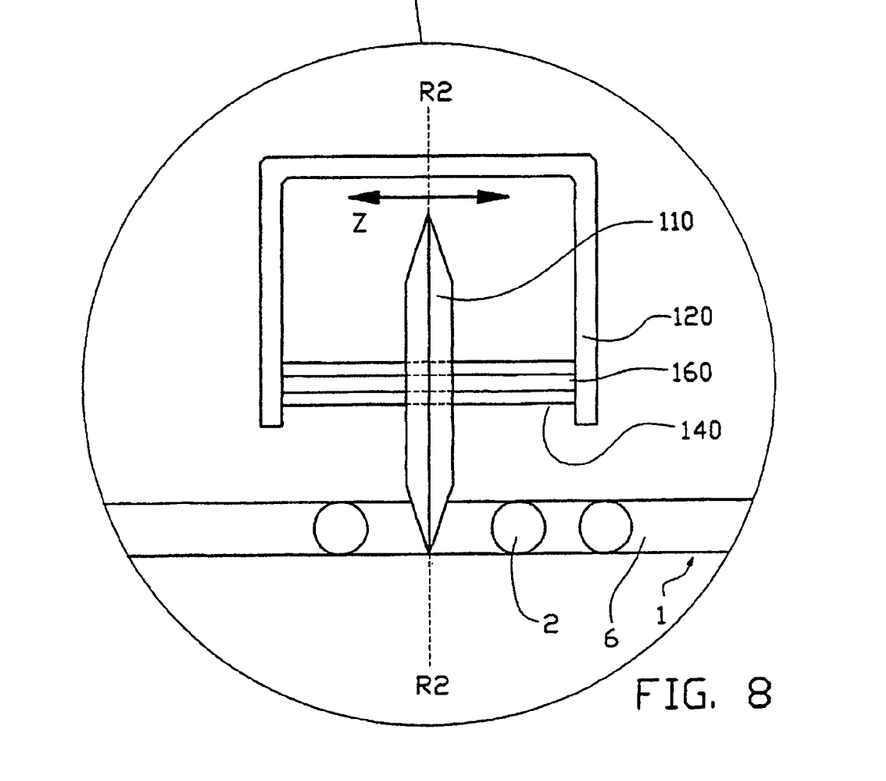
FIG. 8 shows a front view of the cutting device in detail.

FIG. 8 shows an enlargement of the blade 110 with blade holder 120 and blade axle 140 in front view with respect to the blade 110, that means in the cutting direction. The blade is freely movable over the blade axle 140, sideward in the direction Z. The blade axle 140 is furthermore provided with heating means 160 through the blade axis in order to heat the blade 110. As a result the blade 110 is better capable of following the cord unimpeded in the belt layer 1.

The frame is furthermore provided with a cutting guide 105 which—when the cutting device is operative—continues under the continuous strip and over which the blade 110 runs.

Figure 9:
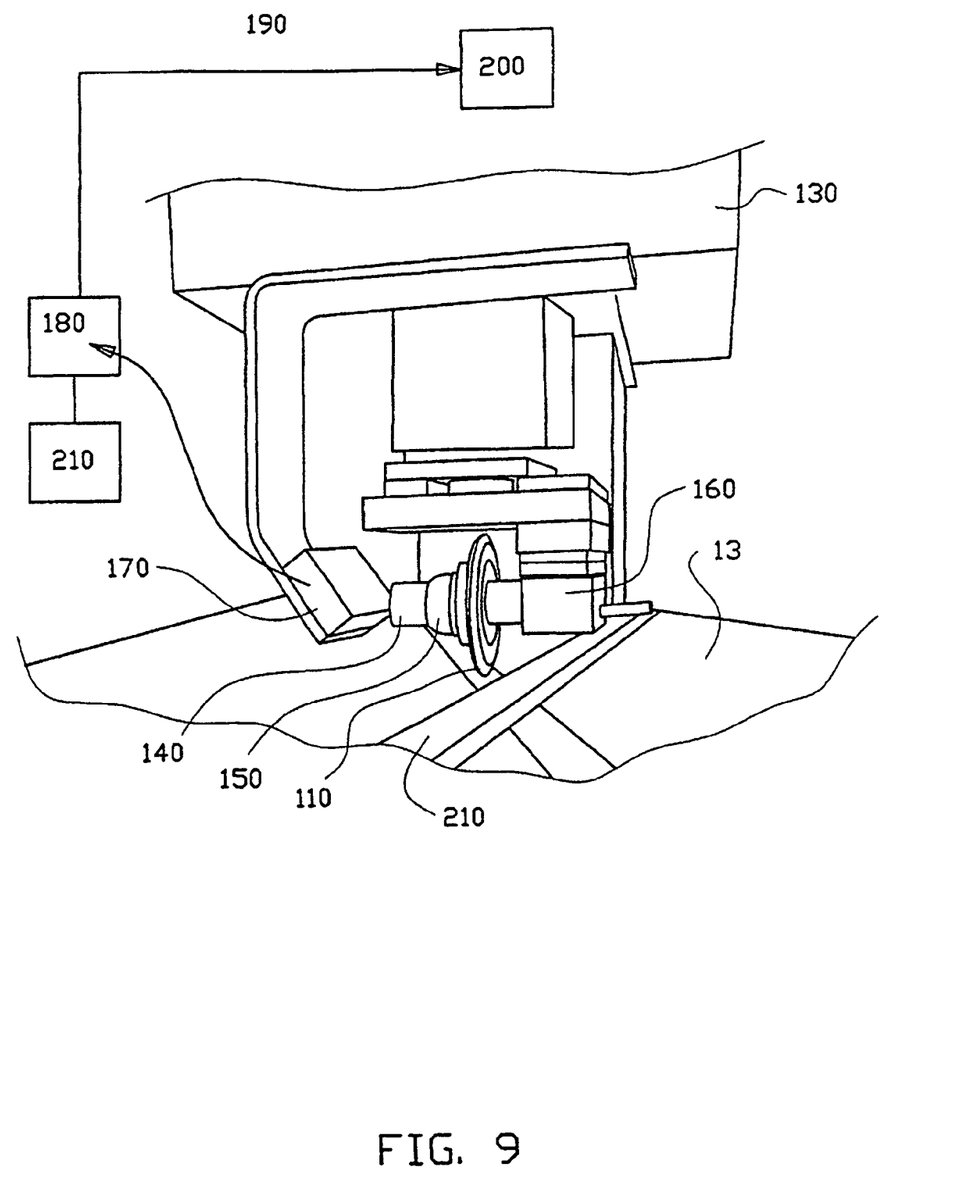
FIG. 9 shows a detail of the blade of the cutting device according to the invention.

FIG. 9 shows a view of another embodiment of the cutting device, which as regards operation corresponds with what has been described above.

The blade 110 is arranged here on a blade axle 140 having free ends and a stop 150. Up to the stop the blade 110 is able to slide freely over the axis 140 in sideward direction. As only the circular blade is able to slide freely over the blade axle during cutting, the blade is able to follow the cord almost unimpeded. The regulation of the frame is indeed such that the blade does not move or moves as little as possible during cutting: as soon as displacement takes place the control computer will intervene and the frame will move along with the displacement in order to prevent that the blade moves or slides further. The direction of rotation of the frame will therefore indeed be in the same direction as the displacement of the blade. The object is that the blade follows a cord, as the cutting direction is almost instantaneously adjusted. As a result the frame will rotate and the blade will hardly move at all. The displacement detector therefore preferably is capable of detecting small displacements.

The cutting device is in this case provided with a displacement detector 170 with which the sideward displacement or location of the blade 110 over or on the blade axle 140 can be measured. Preferably said detector 170 is a laser having a measurement cell. The detector 170 is operationally coupled to a control computer 180. As soon as a displacement of the blade 110 in sideward direction is detected the control unit 180 by means of operational coupling 190 will order the actuator 200 to steer so that no displacement of the blade 110 in sideward direction takes place any more. In this way the blade is able to perfectly follow the cords in the belt layer. From the control of the actuator 200 moreover the exact cutting line realised can be calculated. The control unit therefore preferably is capable of giving the instructions so quickly that the blade is hardly displaced at all. Moreover the frame rotates in the direction of the detected displacement.

Figure 10:
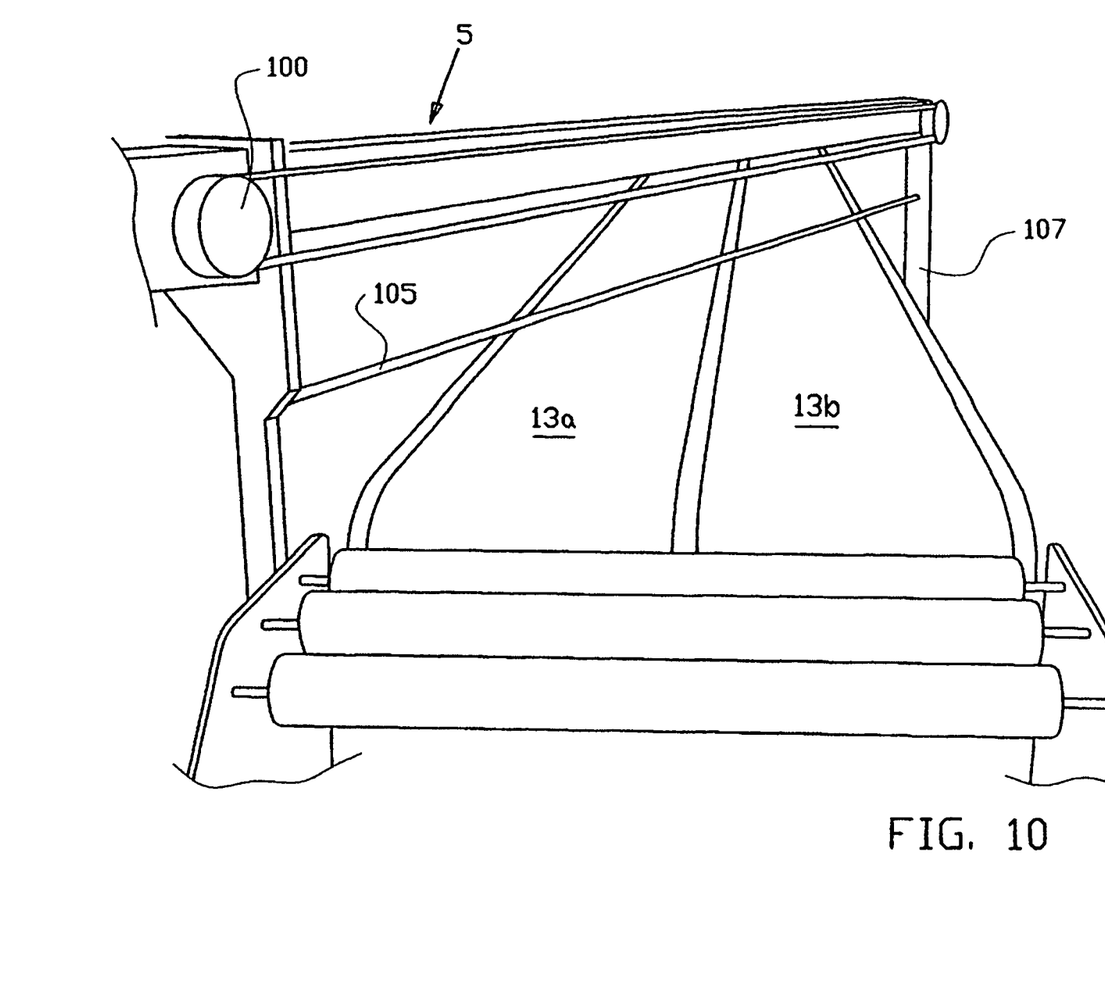
FIG. 10 shows a rear view of the cutting device with conveyor belt.

FIG. 10 shows a rear view of the conveyor belt 13 which has to displace a strip past the cutting device 5. It can be seen that the conveyor belt actually consists of two parallel conveyor belts 13a and 13b that can be driven independent from each other. Said embodiment with parallel conveyor belts 13a and 13b is also possible in the FIGS. 6A-6B.

When the belt layer has been cut, conveyor belt 13b will convey the cut belt layer onwards. The belt layer in that case is fixed to said conveyor belt by means of magnets, preferably switchable magnets, which are situated beyond the cutting device, conveyor belt 13a stands still in that case. Upstream of the cutting device there are switchable magnets underneath said conveyor belt 13a to retain the rest of the strip at that location.

Figure 11A:
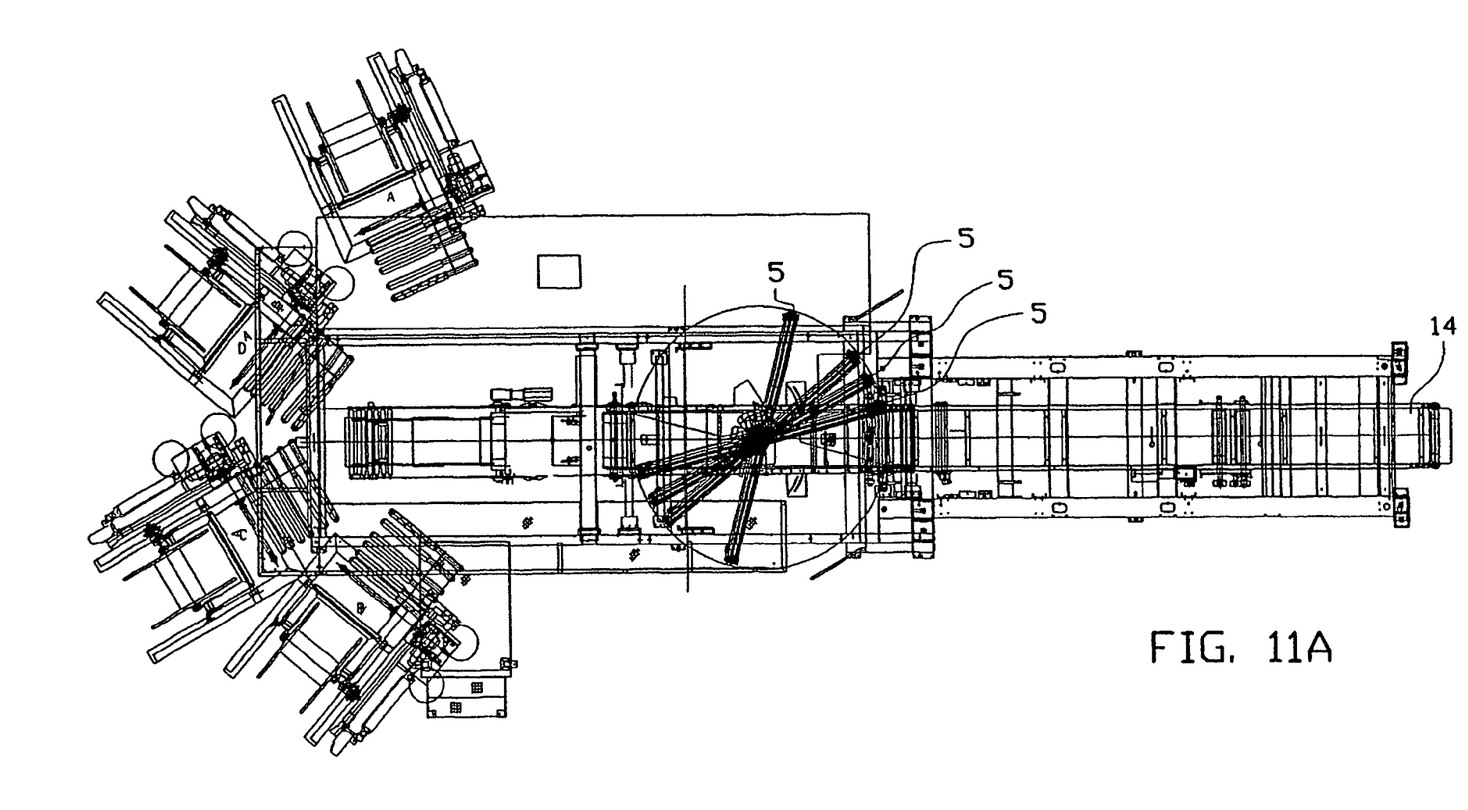
FIGS. 11A and 11B show a top view and a side view, respectively, of a complete device for arranging a belt.
Figure 11B:
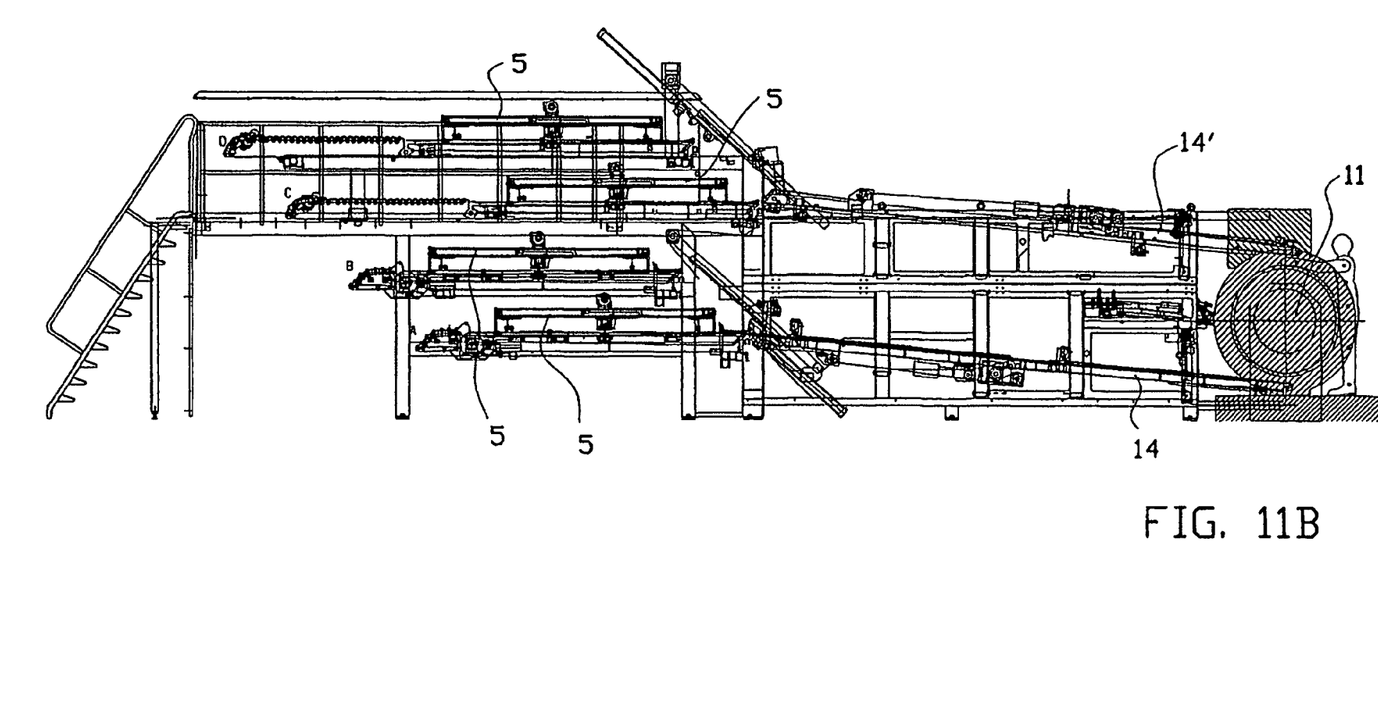

FIG. 11A shows a top view and FIG. 11B shows a side view of a complete device for building a belt. The belt layers are conveyed to building drum 11 by means of conveyor belt 14 (like in FIG. 6) and conveyor belt 14'.

The figure furthermore shows the various cutting devices 5 that correspond to the cutting device described above.

It will be clear that the above description is included to illustrate the operation of a preferred embodiments of the invention, and not to limit the scope of protection of the invention. Starting from the above explanation many variations that fall under the spirit and the scope of protection of the present invention will be evident to an expert.

The invention claimed is:

1. Device for arranging a belt layer provided with parallel cords on a building drum, comprising:
a cutting device for cutting the belt layer from a web at a cutting angle along a cutting line along a cord, for obtaining a substantially parallelogram-shaped belt layer having a leading diagonal side and a trailing diagonal side and cords at a cord angle that is substantially parallel to the diagonal sides and the cutting angle;
a belt layer length sensor for measuring the belt layer length;
a control computer, operationally coupled to the belt layer length sensor and provided with a memory for storing a set cord angle, belt layer width and belt layer length;
an applicator for arranging the belt layer on the building drum with the trailing diagonal side parallel to the leading diagonal side, and wherein the applicator is operationally coupled to the control computer for receiving control signals from said control computer;
wherein the cutting device is provided with a circular blade that is supported on and surrounds a blade axle, wherein the cutting device comprises a rotation driving device for having the cutting angle adjusted during cutting, wherein the rotation driving device is operationally coupled to the control computer for adjusting the cutting angle, wherein in sideward direction with respect to the cutting line the blade is freely slidable over the blade axle during cutting, and wherein the cutting device comprises a displacement detector for detecting changes in the sideward position of the blade, wherein the control computer is provided with software routines for calculating the course of the cutting line from the determinations of the blade position during cutting, comparing the cutting line with the set cord angle and belt layer width, and the measured belt layer length with the set belt layer length and for giving of reference values and control signals based on the reference values and wherein the displacement detector is operationally coupled to the control computer, for when detecting a change in the sideward position having the control computer give a control signal to the rotation driving device for adjusting the cutting angle.

2. Device according to claim 1, wherein the belt layer has a centre line, characterised in that the applicator is adapted for arranging the belt layer on the building drum with the centre line of the leading part and the centre line of the trailing part opposite each other in line.

3. Device according to claim 2, characterised in that the applicator is adapted for arranging the trailing diagonal side in a butting way against the leading diagonal side.

4. Device according to claim 1, characterised in that the applicator comprises a conveying device having driving means, a supply side and a discharge side, for conveying the belt layer in a conveyance direction from the cutting device at the supply side to the building drum at the discharge side, wherein the conveying device comprises a retainer means for retaining a segment of the belt layer on the conveying device free of shifting side wards with respect to the conveyance direction.

5. Device according to claim 4, wherein the retainer means is adapted for retaining the entire belt layer.

6. Device according to claim 5, wherein the conveying device comprises a conveyor belt and wherein the retainer means comprises magnets or electromagnets for retaining belt layers having steel cords onto the conveyor belt or a vacuum device or pressing device for retaining belt layers provided with other types of cords.

7. Device according to claim 4, further comprising a supply device for displacing the web to the cutting device, and after cutting displacing the belt layer cut from the web to the supply side of the conveying device at a discharge side of the supply device.

8. Device according to claim 7, wherein the supply side of the conveying device and the discharge side of the supply device are displaceable with respect to each other laterally with respect to the conveying device and parallel to the axis of rotation of the building drum, particularly during conveying a belt layer.

9. Device according to claim 1, wherein the applicator comprises a first measuring device for measuring the shape of the cutting line of the leading diagonal side, and which is operationally coupled to the control computer.

10. device according to claim 9, wherein the belt layer length sensor is disposed on the applicator.

11. Device according to claim 10, wherein the control computer is operationally coupled to the driving means and the building drum drive for mutually adjusting the winding speed of the building drum and the conveyance speed of the conveying device based on the length and the shape of the leading and trailing cutting lines of the belt layer.

12. Device according to claim 1, wherein the displacement detector is adapted for detecting changes in the sideward position of the blade during cutting.

13. Device according to claim 1, wherein the cutting device further comprises location detectors for detecting the position of the centre of the blade with respect to the conveyor belt.

14. An apparatus for arranging a belt layer comprising parallel cords on a building drum, the apparatus comprising:

a cutting device for cutting the belt layer from a web, the cutting device comprising an axle, a circular blade that is supported on and surrounds the axle, a rotatable frame comprising means for supporting the blade and axle such that the blade can be positioned to cut the belt layer at a cutting line along one cord of the parallel cords at a cutting angle with the blade being slidable along the axle in a direction that is transverse to the cutting line so that the blade can slide between any of a plurality of sideward positions along the axle to follow the cord;

a control computer for controlling operation of the cutting device;

means for detecting the sideward position or change in sideward position of the blade and for transmitting the sideward position or change in sideward position to the control computer such that the control computer can determine when there is a displacement of the blade in the transverse direction and give a control signal to stop further displacement of the blade in the transverse direction;

means for receiving the control signal from the control computer and for rotating the frame to change the cutting angle and to stop further displacement of the blade in the transverse direction;

means for measuring the belt layer length and for transmitting the measured belt layer length to the control computer such that the control computer can determine when the measured belt layer length is equal to a set belt layer length and give a signal to the cutting device to cut the belt layer; and means operationally coupled to the control computer for arranging the belt layer on the building drum.

\* \* \* \* \*

UNITED STATES PATENT AND TRADEMARK OFFICE
CERTIFICATE OF CORRECTION

Page 1 of 1

PATENT NO. : 8,677,871 B2
APPLICATION NO. : 10/592884
DATED : March 25, 2014
INVENTOR(S) : Van Laar et al.

It is certified that error appears in the above-identified patent and that said Letters Patent is hereby corrected as shown below:

On the Title page item 75 where the inventors are listed, "Franciscus Johannes Wilhelums Kooiman" should be changed to -- Franciscus Johannes Wilhelmus Kooiman --.

Signed and Sealed this
First Day of September, 2015

Michelle K. Lee
*Director of the United States Patent and Trademark Office*